Jan. 28, 1947. H. T. HERBST 2,414,874
WELDING
Filed Sept. 17, 1942 2 Sheets-Sheet 1

INVENTOR
HARRY T. HERBST
BY
ATTORNEY

Jan. 28, 1947.  H. T. HERBST  2,414,874
WELDING
Filed Sept. 17, 1942  2 Sheets-Sheet 2

INVENTOR
HARRY T. HERBST
BY
ATTORNEY

Patented Jan. 28, 1947

2,414,874

UNITED STATES PATENT OFFICE 2,414,874

WELDING

Harry T. Herbst, Burlingame, Calif., assignor to Union Carbide and Carbon Corporation, a corporation of New York Application September 17, 1942, Serial No. 458,627

6 Claims. (Cl. 113—112)

This invention relates to machine welding and more particularly to an improved method of pipe and tube welding. The present application is in part a continuation of application Serial No. 349,393, filed August 2, 1940, for Welding.

In the art of pipe welding, metal skelp of the required dimensions is heated in a furnace until it is sufficiently hot to become pliable. The heated skelp is then gripped with a pair of tongs, and the tongs and the skelp are drawn through a forming bell or between shaping rolls. In this operation, the heated skelp is formed into a tubular shape and its opposite longitudinal edges are brought together. Simultaneously with the pipe forming operation, the longitudinal edges of the skelp are weld united to complete the pipe.

In tube welding, the skelp is formed, while cold, into a tubular shape in a separate operation. The longitudinal edges of the formed skelp are later weld united to complete the tubing.

In both pipe and tube welding, when the welding is done by the oxy-fuel gas process, a series of preheating flames or jets are directed upon at least the longitudinal edges of the skelp, and are followed by a series of welding flames or jets which weld unite the skelp edges as the skelp enters the closing die or closing pressure rolls. One type of welding flame is a low velocity flame that is neutral in nature, i. e., one supplied with substantially equal volumes of oxygen and fuel gas. For various reasons, both series of flames or jets are usually provided by one welding head supplied with a gaseous heating mixture from a single blowpipe. Consequently, the type of preheating flame heretofore used has also been a low velocity neutral flame. This type of flame, however, when employed to preheat the work, is unstable and requires much auxiliary apparatus, such as air jets, to improve its stability and effect a more uniform heating. As the rate of heat transfer of this type of preheating flame is low, the speed of the operation is consequently limited to a substantial extent.

Oxy-acetylene tube welding mills require less precision in setup and operation than other types of equipment, thus simplifying labor requirements and usually reducing scrap losses. If the welding speeds are stepped up, the same amount of labor can produce more feet of tubing in a given length of time. Moreover, the higher speeds and more efficient welding equipment reduce gas consumption. Additionally, such oxy-acetylene tube welding mills show savings in initial investment which mean lower depreciation costs.

Oxy-acetylene welding is used with excellent results not only to make tubings of ordinary steels, but also of stainless and other alloy steels. In fact, this method has proved to be the most practical one for such materials. With the use of stainless and alloy steels steadily increasing, this versatility offers definite advantages. For the foregoing reasons, an efficient oxy-acetylene tube welding apparatus is of great value in reducing tube welding costs and in increasing the quality of the product.

It is therefore an object of this invention to provide a machine welding method wherein both the speed and efficiency of the welding operation are substantially increased without impairing the uniformity and quality of the finished weld. Other objects are to provide an improved welding method in which one or more preheating flames or jets and one or more welding flames or jets are directed, preferably in a single file, on the work to be welded; to provide such a method in which the preheating flames or jets and the welding flames or jets are each supplied with a separate gaseous heating mixture which may be adjusted separately to vary either the intensity or the oxy-fuel gas or oxy-acetylene ratio of each set of flames or jets for maximum welding efficiency; and to provide a pipe and tube welding process in which the necessity for auxiliary flame stabilizing means is eliminated.

These and other objects of the invention will in part be obvious and in part become apparent from the following description and the accompanying drawings, in which.

Figure 3:
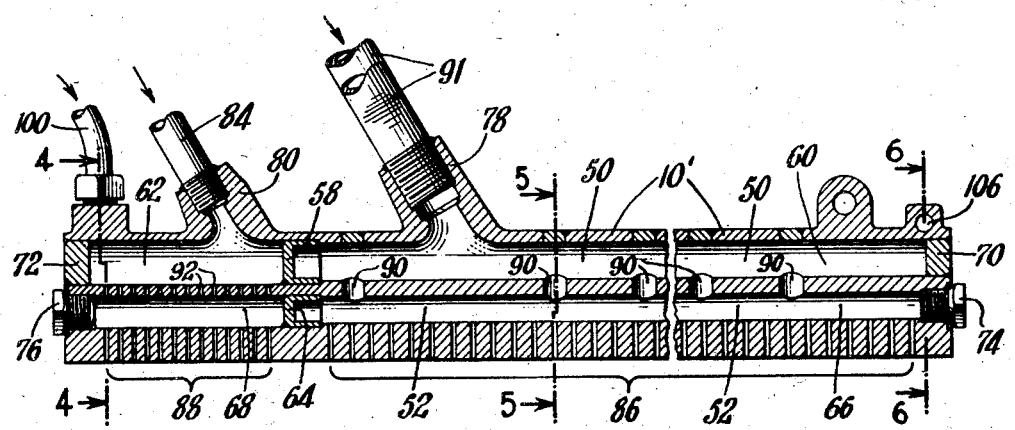
Fig. 3 is a view in longitudinal-vertical section of the welding head.
Figure 4:
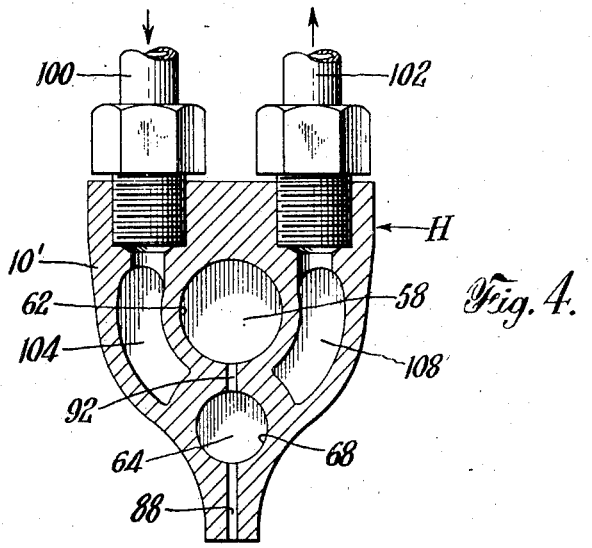
Figure 5:
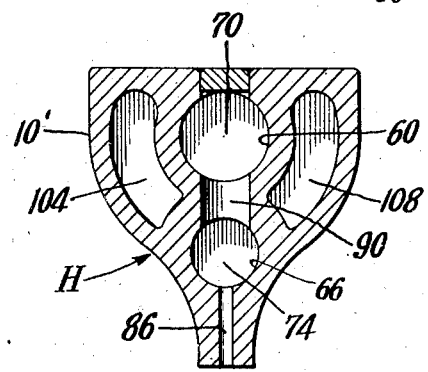
Figure 6:
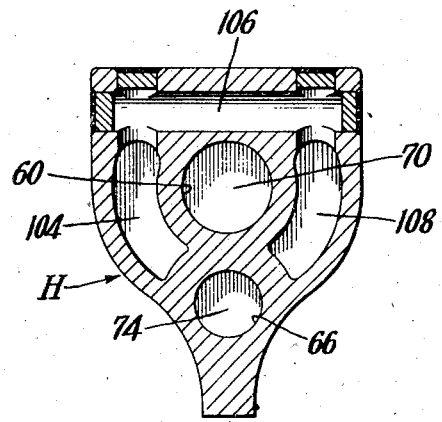
Figure 7:
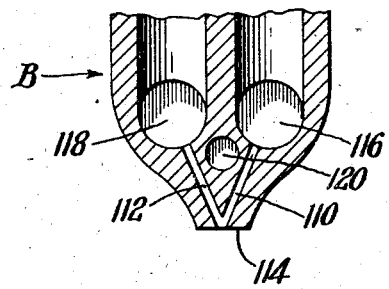

Figs. 4, 5 and 6 are enlarged transverse sectional views taken on lines 4—4, 5—5 and 6—6, respectively, of Fig. 3; and Fig. 7 is a fragmentary sectional view of a modification of the invention employing externally or post-mixed flames.

Generally speaking, in practicing the method of the invention, the work is progressively preheated by a series of relatively high velocity preheating flames or jets of an oxidizing nature directed upon the work. The welding is accomplished by directing a series of relatively low velocity welding flames or jets of either a neutral or a carburizing nature on the skelp edges just before the skelp enters the closing die or closing pressure rolls. Both series of jets are preferably provided by a single unitary welding head.

In one type of welding head for carrying out the invention, each series of jets is provided with a separate gaseous mixture from a separate blowpipe means and both blowpipe means are connected to a single unitary multi-flame welding head. In another type of welding head for carrying out the invention the oxygen and acetylene are mixed externally.

Figure 2:
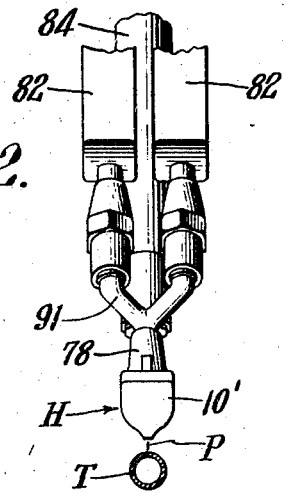
Fig. 2 is a view in front elevation of such apparatus.
Figure 1:
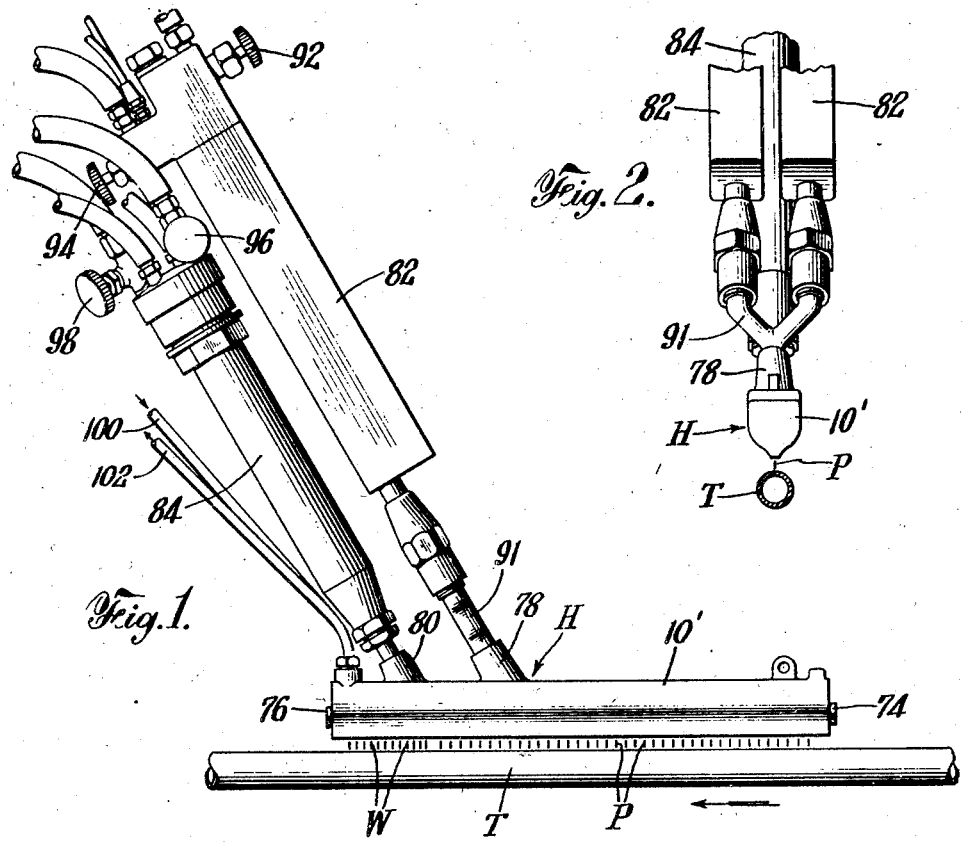
Fig. 1 is a view in side elevation of apparatus exemplifying the invention.

Referring more particularly to the drawings, Fig. 1 illustrates the method of the invention as applied to pipe and tube welding, in which a multi-flame welding head H is shown as arranged in operative relation to the work, such as formed skelp T. The skelp T moves in the direction of the arrow, and as the skelp edges pass beneath head H, the latter successively directs a series of preheating flames or jets P and a series of welding flames or jets W upon the skelp edges. Immediately after the formed skelp passes beneath the welding flames W, it passes through the closing die or closing pressure rolls (not shown) wherein the melted skelp edges are forced together to form a pressure welded seam in the case of pipe welding or held together to form a fusion welded seam in the case of tube welding. The preheating flames rapidly heat the skelp edges to a high temperature, and the welding flames complete the fusion of the edges, whereby the edges may be forced together to form the seam or simply fused together without force. It will be noted that both sets of flames are directed on the work from the single heating head H in a manner described more fully hereinafter.

In the welding head illustrated in Figs. 1–6, both series of flames or jets are provided by a single unitary multi-flame welding head, the gaseous heating mixture for each series of flames or jets being provided from a separate blowpipe or gas mixing device. Referring particularly to Figs. 1–6, the unitary multi-flame welding head comprises a shell 10' drilled longitudinally to form passages 50 and 52. A fixed baffle 58 divides passage 50 into a preheating gas inlet section 60 and a welding gas inlet section 62. Similarly, a fixed baffle 64 divides passage 52 into outlet chambers 66 and 68. The outer ends of sections 60 and 62 are closed by fixed plugs 70 and 72, respectively, and the outer ends of chambers 66 and 68 are closed by removable plugs 74 and 76, respectively. If desired, plugs 70 and 72 also may be made removable.

Threaded inlet portions 78 and 80 are formed in the upper wall of each chamber 60 and 62 for receiving the ends of blowpipes or gas mixing means 82 and 84, respectively. The lower wall of chamber 66 is formed with a series of preheating gas discharge ports or orifices 86, and the lower wall of chamber 68 is formed with a series of welding gas discharge ports or orifices 88. Holes 90 and 92 provide communication between chambers 60 and 66 and between chambers 62 and 68, respectively. With this embodiment of the invention, the relative oxy-acetylene ratios and velocities of the preheat flames or jets and the welding flames or jets may be independently regulated by suitable adjustments of the blowpipe means 82 and 84.

The blowpipe means 82 includes two blowpipes which are connected to the inlet portion 78 by means of a Y-connection 81 to supply the preheat gases to the head H. The use of two blowpipes is desirable due to the relatively high gas requirements of the preheating flames P. The nature of these flames is adjusted by turning oxygen and acetylene valves 92 and 94. The blowpipe means 84 preferably is a blowpipe of the medium pressure type characterized by its high flashback resistance. This blowpipe has independent oxygen and acetylene valves 96 and 98 for adjusting the welding flame gas mixture as desired.

An important feature of this invention resides in the variability of the oxy-acetylene ratio in the front and rear sections of the head by the use of the separate blowpipe means. This factor, together with the use of high velocity preheat and low velocity welding flames, makes possible large savings in gas consumption. This is particularly evident in the welding of certain alloy steels wherein the welding technique involves the use of low temperature carburizing flames.

Cooling fluid inlet and outlet pipes 100 and 102 are connected to the shell 10' near the rear end thereof. The cooling fluid, preferably water, flows forwardly through a passage 104 extending longitudinally within one side of the shell 10' to the front end thereof, across the shell through a transverse passage 106 within the front end of the shell, and then flows rearwardly through a passage 108 extending longitudinally within the other side of the shell to the rear end thereof. This prevents the head H from overheating in use.

When the unitary multi-flame welding head is employed for pipe and tube welding, as illustrated in Fig. 1, it is so disposed that the series of preheating and welding ports or discharge orifices 86 and 88 will be aligned parallel to the seam to be welded in a single file. After the heated skelp T is formed into a tubular shape, its longitudinal edges are progressively brought beneath the welding head. The high velocity preheating flames P rapidly heat the skelp edges to a welding temperature, and no stabilizing devices are necessary satisfactorily to preheat the adjacent skelp edges. The high rate of heat transfer of the preheating flames increases the speed and economy of the operation. As the preheated edges emerge from beneath the preheating flames or jets P, the low velocity welding flames or jets W progressively melt the metal of the edges, and, as the formed skelp T passes through the closing die or closing pressure rolls, a strong weld of uniformly high quality is produced.

The combining of the preheating and welding apparatus in a single unitary welding head increases the simplicity of welding and results in a considerable economy of space without detracting from the quality of the weld.

The invention, when used for the manufacture of steel tubing, particularly light-gauge, small diameter tubing, has made possible the production of consistently good tubing at speeds as high as 150 feet per minute. The dual blowpipe arrangements permit flame adjustments for maximum efficiency. For example, the gas mixture discharged by the leading three-fourths of the head may be independently adjusted to produce oxidizing flames to provide high temperature preheat, while the gas mixture discharged by the trailing one-fourth of the head may be adjusted to produce neutral flames to maintain correct conditions over the weld puddle. This makes possible the welding of tubing at higher speeds and lower costs.

Referring to Fig. 7, there is shown a head B in which the gases, such as oxygen and acetylene, are discharged by separate passages 110 and 112 to produce an externally or post-mixed flame of the desired nature. The passage 110 and 112 are arranged so as to meet at the face 114 of the head B. An oxygen chamber 116 and an acetylene chamber 118 are provided in the head B, as well as a cooling fluid passage 120. The head B may be divided into front and rear sections for preheat flames and welding flames, as shown in Fig. 1, and the operation of the head B is similar to that described in connection with such figure, except that the use of mixers or blowpipes with the head B are obviated, and backfires and flashbacks are rendered impossible.

The head, of course, may be made so that the gases are post-mixed to provide the preheat flames and premixed to provide the welding flames. The relatively high velocity and naturally oxidizing nature of the post-mixed flames renders the latter ideal for preheating work containing ferrous metal, such as iron and steel.

It should be understood that the invention may be variously embodied otherwise than as shown and described without departing from the principles of the invention and within the scope of the appended claims.

What is claimed is:

1. The method of progressively heating and welding a seam by means of a series of relatively high velocity oxy-acetylene preheat flame jets and a series of relatively low velocity oxy-acetylene welding flame jets, arranged in a single line parallel to the seam, characterized in that the oxy-acetylene ratio of preheat flame jets is oxidizing, and that of the welding flame jets is neutral.

2. A method of welding pipe or tubes which comprises supporting work in position to be welded and successively directing upon the work to be welded a series of substantially high velocity oxidizing preheat flames and a series of low velocity non-oxidizing welding flames of a lower temperature than that of said preheat flames.

3. Process of welding ferrous metal which comprises first applying a series of oxidizing oxy-fuel gas flames of relatively high velocity against the edges of a seam moving under such flames, and then applying a series of neutral oxy-fuel gas flames of relatively low velocity against such heated edges, causing the metal to fuse and weld along such seam.

4. A method of welding pipe or tubes which comprises successively directing upon the work to be welded a series of preheat flames of high velocity and a series of welding flames of low velocity, the preheat flames having a substantially higher temperature than that of the welding flames, and such preheat flames being oxidizing while the welding flames are carburizing in nature.

5. The method of welding metal tubing by the oxy-acetylene process which comprises moving a tube having a single seam horizontally in the direction of its length at a rapid rate with the seam uppermost, gently closing such seam against the natural tendency of the walls to spring open, applying a series of oxy-acetylene flames downwardly against the tube along such seam in two groups, the leading flame group acting to preheat the metal along the edges of the seam, and the remaining group acting to melt such metal and complete the weld, supplying said preheating flames with a mixture of oxygen and acetylene in such ratio that the resulting flames are oxidizing, supplying said welding flames with a mixture of oxygen and acetylene in such ratio that the resulting flames are neutral, and discharging the gas jets for the preheating flames at a velocity that is substantially higher than that of the welding flames.

6. In the art of welding metal tube at high speed by the oxy-acetylene process, which is subject to undesirable inefficiency and instability of the preheating flames when their velocity is increased to increase the speed of welding, the method of overcoming such difficulties and increasing the flame stability as well as the heating efficiency, which comprises increasing the velocity of the preheating flames to a value substantially higher than that of the welding flames, and changing the ratio of oxygen to acetylene in the gas mixture so that such preheating flames are oxidizing, while the welding flames are kept neutral.

HARRY T. HERBST.